United States Patent
Povey et al.

(10) Patent No.: US 11,743,055 B2
(45) Date of Patent: Aug. 29, 2023

(54) STORING DATA ON TARGET DATA PROCESSING DEVICES

(71) Applicant: SECURE THINGZ LIMITED, Cambridge (GB)

(72) Inventors: Haydn Povey, Cambridge (GB); Steve Pancoast, Cedar Park, TX (US); Mike Moreton, Cambridge (GB)

(73) Assignee: Secure Thingz Limited, Cambridge (GB)

(*) Notice: Subject to any disclaimer, the term of this patent is extended or adjusted under 35 U.S.C. 154(b) by 121 days.

(21) Appl. No.: 16/495,283

(22) PCT Filed: Apr. 11, 2018

(86) PCT No.: PCT/GB2018/050965
§ 371 (c)(1),
(2) Date: Sep. 18, 2019

(87) PCT Pub. No.: WO2018/189538
PCT Pub. Date: Oct. 18, 2018

(65) Prior Publication Data
US 2020/0036535 A1    Jan. 30, 2020

(30) Foreign Application Priority Data
Apr. 11, 2017 (GB) .................................. 1705871

(51) Int. Cl.
*H04L 9/32* (2006.01)
*G06F 21/60* (2013.01)
*H04L 9/30* (2006.01)

(52) U.S. Cl.
CPC .......... *H04L 9/3268* (2013.01); *G06F 21/602* (2013.01); *H04L 9/3073* (2013.01)

(58) Field of Classification Search
CPC .... H04L 9/3073; H04L 9/3268; G06F 21/602
See application file for complete search history.

(56) References Cited

U.S. PATENT DOCUMENTS

| | | | |
|---|---|---|---|
| 7,428,638 B1 | 9/2008 | Chen et al. | |
| 2002/0199110 A1* | 12/2002 | Kean | G06Q 30/06 713/189 |

(Continued)

FOREIGN PATENT DOCUMENTS

| | | |
|---|---|---|
| GB | 2543096 A | 10/2015 |
| WO | WO 2018/189538 A1 | 10/2018 |

OTHER PUBLICATIONS

Apala Ray • Johan Akerberg • Mats Bjorkman • Rolf Blom • Mikael Gidlund; Applicability of LTE Public Key Infrastructure Based Device Authentication in Industrial Plants; 2015 IEEE 39th Annual Computer Software and Applications Conference (vol. 2, pp. 510-515); (Year: 2015).*

(Continued)

*Primary Examiner* — Luu T Pham
*Assistant Examiner* — Chao Wang
(74) *Attorney, Agent, or Firm* — Hamilton, Brook, Smith & Reynolds, P.C.

(57) ABSTRACT

A method of storing data on target data processing devices, the method comprising: for each target data processing device, using a security data processing device on which first data has been stored to: obtain a device cryptographic certificate from the target data processing device, the device cryptographic certificate having been generated by, and being verifiable as having been generated by, a trusted entity; verify the device cryptographic certificate as having been generated by the trusted entity; generate second data using the first data; and store the second data on the target data processing device.

16 Claims, 2 Drawing Sheets

(56) References Cited

U.S. PATENT DOCUMENTS

| | | | | |
|---|---|---|---|---|
| 2007/0186110 A1* | 8/2007 | Takashima | ........... | H04N 21/835 |
| | | | | 375/E7.009 |
| 2009/0083539 A1 | 3/2009 | Catherman et al. | | |
| 2009/0217054 A1 | 8/2009 | Haider et al. | | |
| 2010/0293103 A1 | 11/2010 | Nikitin et al. | | |
| 2012/0036364 A1* | 2/2012 | Yoneda | ................ | H04L 9/3249 |
| | | | | 713/175 |
| 2014/0044265 A1* | 2/2014 | Kocher | ................ | H04L 9/3247 |
| | | | | 380/277 |
| 2014/0237255 A1* | 8/2014 | Martin | ................ | G06F 21/6209 |
| | | | | 713/182 |
| 2014/0281502 A1* | 9/2014 | Keung Chan | ............. | H04L 9/30 |
| | | | | 713/157 |
| 2018/0227279 A1* | 8/2018 | Kim | ........................ | H04W 4/80 |

OTHER PUBLICATIONS

D.S. Dawoud; A proposal for secure software download in SDR; 2004 IEEE Africon. 7th Africon Conference in Africa (IEEE Cat. No. 04CH37590) (vol. 1, pp. 77-82 vol. 1); (Year: 2015).*

C. Lesjak • T. Ruprechter • J. Haid • H. Bock • Eugen Brenner; A secure hardware module and system concept for local and remote industrial embedded system identification; Proceedings of the 2014 IEEE Emerging Technology and Factory Automation (ETFA) (pp. 1-7); (Year: 2014).*

International Search Report and Written Opinion for Int'l Application No. PCT/GB2018/050965, titled: Storing Data on Target Data Processing Devices, dated Jun. 20, 2018.

Search Report for UK Patent Application No. GB1705871.0 entitled "Storing Data on Target Data Processing Devices," dated Oct. 12, 2017.

* cited by examiner

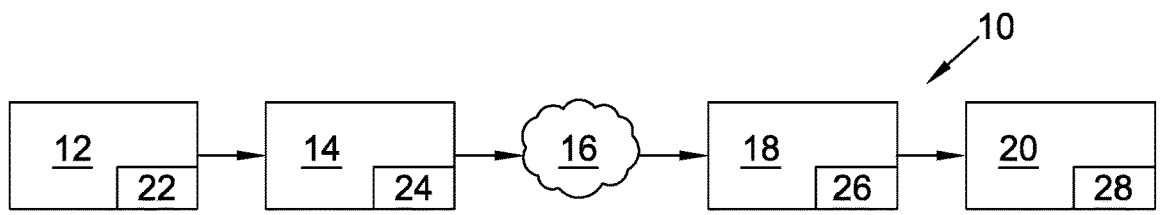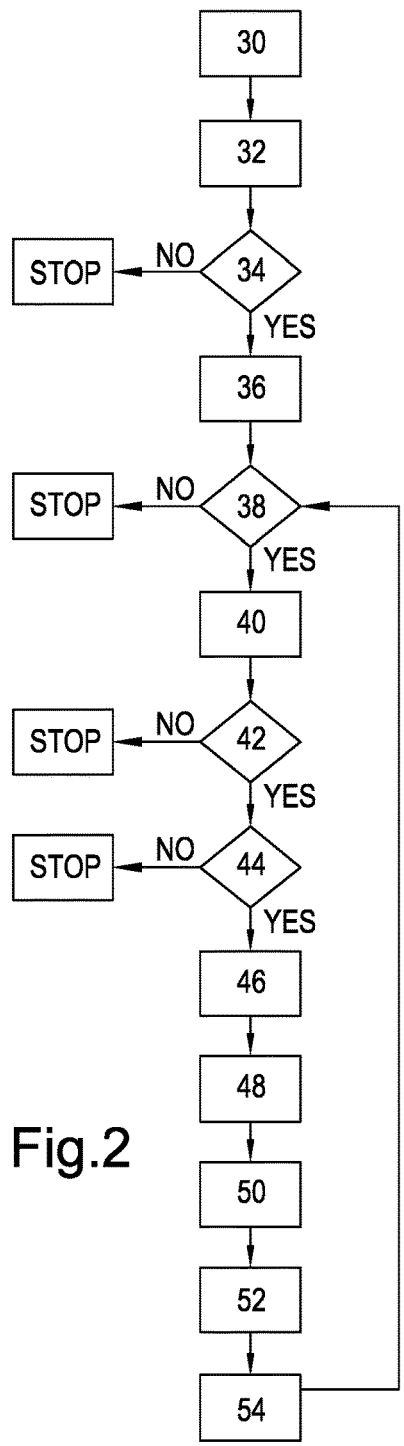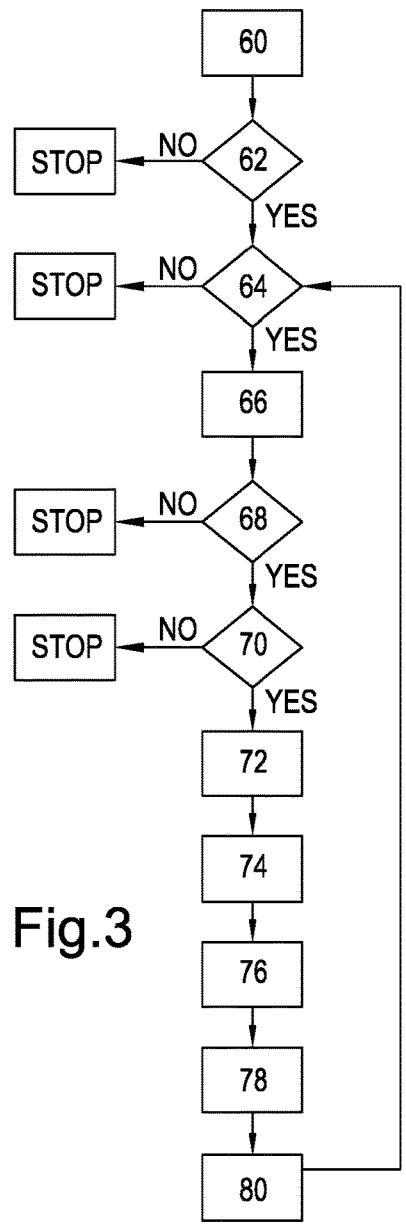

STORING DATA ON TARGET DATA PROCESSING DEVICES

This application is the U.S. National Stage of International Application No. PCT/GB2018/050965, filed on Apr. 11, 2018, which designates the U.S., published in English, and claims priority under 35 U.S.C. § 119 or 365(c) to Great Britain Application No. 1705871.0, filed on Apr. 11, 2017. The entire teachings of the above applications are incorporated herein by reference.

FIELD OF THE INVENTION

This invention relates to a method of storing data on target data processing devices, and to a security data processing device suitable for use in the method of the invention.

BACKGROUND TO THE INVENTION

Original equipment manufacturers (OEMs) often require data to be stored on target data processing devices as part of a manufacturing process for items of electronic equipment including those target data processing devices.

It is known to use contract manufacturers (CMs) to store the data on the target data processing devices, in order to reduce the manufacturing costs of the items of electronic equipment.

However, where the data to be stored on the target data processing devices is valuable, the OEM cannot trust the CM not to misuse the data.

It would be desirable for an OEM to be able to provide data to an untrusted entity to store the data on target data processing devices and to be able to prevent the untrusted entity from misusing the data.

SUMMARY OF THE INVENTION

According to a first aspect of the invention there is provided a method of storing data on target data processing devices, the method comprising:
for each target data processing device, using a security data processing device on which first data has been stored to:
obtain a device cryptographic certificate from the target data processing device, the device cryptographic certificate having been generated by, and being verifiable as having been generated by, a trusted entity;
verify the device cryptographic certificate as having been generated by the trusted entity; generate second data using the first data; and
store the second data on the target data processing device.

The invention can provide a method of storing data on target data processing devices, which method, if an appropriate security data processing device and appropriate target data processing devices are used, enables a provider of data to use an untrusted entity to store the data on the target data processing devices, and prevent, or at least make extremely difficult, modification of the data and storage of the data on devices other than the target data processing devices.

The method may further comprise receiving encrypted first data, storing the encrypted first data on the security data processing device, and, using the security data processing device, decrypting the encrypted first data and storing them on the security data processing device.

The method may alternatively further comprise receiving the security data processing device on which has been stored the first data.

Where the method comprises receiving the encrypted first data, the method preferably further comprises receiving a value of a permitted number of target data processing devices on which the second data are permitted to be stored, and storing the value on the security data processing device; and
for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

Where the method comprises receiving the security data processing device on which have been stored the first data, the method may advantageously comprise receiving the security data processing device on which have been stored the first data and a value of a permitted number of target data processing devices on which the second data are permitted to be stored; and
for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

Where the method comprises receiving the security data processing device on which have been stored the first data, the method may alternatively advantageously comprise receiving a value of a permitted number of target data processing devices on which the second data are permitted to be stored, and storing the value on the security data processing device; and for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

Where the method comprises receiving the value or the security data processing device on which the value is stored, the invention can provide a method that also enables the provider of data to prevent, or at least make extremely difficult, storage of the data on more than the permitted number of target data processing devices.

The approach of receiving the security data processing device on which have been stored the first data, receiving the value of the permitted number of target data processing devices and storing the value on the security data processing device enables a provider of data to use the untrusted entity to store the data on plural batches of target data processing devices, by sending a value of a permitted number of target data processing devices for each batch of target data processing devices.

In some embodiments of the invention receiving the encrypted first data comprises receiving them on the security data processing device via an Internet connection.

In other embodiments receiving the encrypted first data comprises receiving them by electronic mail, for example, or on a data carrier, such as a CD-ROM, USB stick or Java® card.

In these embodiments the method further comprises transferring the encrypted first data to the security data processing device.

Where the method comprises receiving the value of the permitted number of target data processing devices, preferably the method comprises receiving an encrypted value, and using the security data processing device to decrypt the encrypted value and store the decrypted value on the security data processing device.

Obfuscation of the value, for example by encryption, is desirable to make it more difficult for an untrusted entity to store the second data on more than the permitted number of target data processing devices.

Where the method comprises receiving the encrypted first data and encrypted value on a data carrier, the method preferably comprises receiving the encrypted first data and encrypted value on a rewriteable data carrier, and altering the contents of the rewriteable data carrier after transferring the encrypted first data and encrypted value to the security data processing device, to prevent reuse of the encrypted first data and encrypted value.

Altering the contents of the rewriteable data carrier may, for example, comprise overwriting the contents of the rewriteable data carrier.

In this way an untrusted entity can be prevented from using the encrypted first data and encrypted value on multiple occasions or on multiple security data processing devices.

Where the method comprises receiving the security data processing device on which have been stored the first data, if an appropriate security data processing device, such as a hardware security module (HSM), is used, encryption of the first data is unnecessary, because the security data processing device makes access to the first data extremely difficult.

Examples of suitable security data processing devices are a Thales Solo HSM and a Gemalto IDcore 10 Java® card.

In some embodiments of the invention, decrypting the encrypted first data comprises decrypting the encrypted first data using a decryption key stored on the security data processing device.

In that case the decryption key is a shared key that matches a key held by an entity that provides the encrypted first data.

This approach has the disadvantage of a lack of flexibility in that a shared key must be stored on a security data processing device for each entity that may wish to provide encrypted first data to the security data processing device, before the security data processing device is delivered to an untrusted entity to carry out the method of the invention.

As will be familiar to those skilled in the art of public key cryptography, two parties can generate a shared secret key by each generating a public key and a private key, exchanging the public keys, and each combining that party's private key with the other party's public key to generate the shared secret key.

Preferably, therefore, the method comprises the security data processing device receiving a public key of a first public key encryption key pair, transmitting a public key of a second public key encryption key pair stored on the security data processing device, combining the public key of the first key pair with a private key of the second key pair to produce a shared key, receiving encrypted first data that have been encrypted using the shared key, and decrypting the encrypted first data using the shared key.

This approach is considerably more flexible, in that a new shared key can be produced for each entity that wishes to provide encrypted first data to the security data processing device, after the security data processing device has been delivered to an untrusted entity to carry out the method of the invention.

The first data may advantageously comprise computer-readable instructions for use by the security data processing device. The computer-readable instructions may, for example, be for use by the security data processing device to generate identities, such as complex serial codes, for the target data processing devices.

Where the first data comprise computer readable instructions for use by the security data processing device, generating the second data using the first data may, for example, comprise, for each target data processing device, executing the computer-readable instructions to generate a unique identity for the target data processing device.

The first data may advantageously comprise program code for execution by the target data processing devices.

The first data may advantageously comprise configuration data that determine the operation of program code stored on the target data processing devices.

Where the first data comprise program code and/or configuration data, generating the second data using the first data may comprise copying at least part of the first data.

Generating the second data may further comprise encrypting the at least part of the first data.

The first data may advantageously comprise a private key of a public key cryptographic key pair.

Where the first data comprise a private key of a public key cryptographic key pair, generating the second data using the first data may advantageously comprise, for each target data processing device, generating a further cryptographic certificate for the target data processing device by signing the device cryptographic certificate using the private key.

Generating the further cryptographic certificate may advantageously further comprise signing the device certificate and a device identifier for the target data processing device using the private key.

In this way, using a public key of a trusted entity, the further cryptographic certificate can be verified as having been generated by the trusted entity, and the device identifier can be obtained.

A user of a target data processing device that has had stored on it such a further cryptographic certificate using the method of the invention can be confident both that the target data processing device has originated from a trusted entity such as a manufacturer of the device, and that a device identifier for the device is that intended for the device by a trusted entity, such as the manufacturer of the device, i.e., the device is not counterfeit.

The further cryptographic certificate could also be used by a provider of services that has been requested to provide data services to an item of electronic equipment including the target data processing device to verify that the item of electronic equipment is authorised to receive the requested data services.

The security data processing device may advantageously have stored on it a cryptographic certificate generated by, and verifiable as having been generated by, a trusted entity.

As will be familiar to those skilled in the art of public key cryptography, the cryptographic certificate may be generated using public key encryption, whereby the trusted entity signs a message using a private key of a key pair, which message can be verified using a public key of the key pair.

Where the security data processing device has a cryptographic certificate stored on it, the method may advantageously further comprise obtaining the cryptographic certificate from the security data processing device and verifying that the cryptographic certificate has been generated by the trusted entity.

The entity to which a security data processing device has been delivered in order to carry out the method of the invention can then be confident that the security data processing device has originated from a trusted entity.

Where the method comprises receiving the encrypted first data and the value and storing them on the security data processing device, it is envisaged that verifying that the cryptographic certificate stored on the security data processing device would be carried out once, upon delivery of the security data processing device, and before carrying out the method of the invention.

Where the method comprises receiving a security data processing device on which have been stored the first data and the value, it is envisaged that verifying that the cryptographic certificate stored on the security data processing device would be carried out each time the method of the invention is carried out.

Where the encrypted first data are not received on the security data processing device, the encrypted first data may advantageously include a signature, and the method further include using the security data processing device to check for the presence of the signature in the encrypted first data, and to provide an indication of whether the signature is present.

Using the security data processing device to provide the indication may, for example, simply comprise interrupting the method if the signature is not present in the encrypted first data.

Where the cryptographic certificate has been stored on the security data processing device and the encrypted first data include the signature, a party that has received the encrypted first data and the security data processing device can be confident, if the security data processing device provides an indication that the signature is present in the encrypted first data, that the encrypted first data originate from a trusted entity and that the security data processing device originates from a trusted entity.

In preferred embodiments of the invention receiving the encrypted first data and the value comprise receiving a cryptographic certificate comprising the encrypted first data and an encrypted value of the permitted number of target data processing devices.

Data processing devices that have stored on them a unique cryptographic certificate and that are able to output that certificate in response to a request are known. An example of such a device is an Infineon Optiga secure element.

Verifying the device cryptographic certificate as having been generated by the trusted entity typically comprises verifying the device cryptographic certificate as having been generated by a manufacturer of the target data processing device.

The method may advantageously further comprise, for each target data processing device, storing at least a portion of the device cryptographic certificate on the security data processing device.

The method may advantageously further comprise encrypting the at least portions of the device cryptographic certificates using the security data processing device and transmitting the encrypted at least portions of the device cryptographic certificates via an Internet connection or storing them on a data carrier.

In this way the provider of data can be provided with audit information from the untrusted entity identifying on which target data processing devices, and therefore on how may target data processing devices, the second data have been stored.

According to a second aspect of the invention there is provided a security data processing device comprising a processor and a memory containing a decryption key and program code executable by the processor to:
obtain a device cryptographic certificate from a target data processing device;
verify the device cryptographic certificate;
generate second data using first data stored in the memory; and
store the second data on the target data processing device.

The program code may advantageously be executable by the processor to decrypt encrypted first data stored in the memory using the decryption key.

Preferably the decryption key is a private key of a first public key encryption key pair stored in the memory and the security data processing device is operable to receive a public key of a second public key encryption key pair, to transmit a public key of the first public key encryption key pair, combine the public key of the second key pair with the private key of the first key pair to produce a shared key, receive encrypted first data that have been encrypted using the shared key, and decrypt the encrypted first data using the shared key.

The security data processing device may advantageously be operable to receive an encrypted cryptographic certificate that includes the first data and instructions executable by the processor, to decrypt the encrypted cryptographic certificate, to verify the cryptographic certificate as having been generated by a trusted entity using a public key of the trusted entity, and to execute the instructions executable by the processor to generate the second data from the first data.

The processor and memory preferably form part of a hardware security module (HSM).

According to another aspect of the invention there is provided a method of storing data on target data processing devices, the method comprising: receiving encrypted first data, storing the encrypted first data on a security data processing device, and, using the security data processing device, decrypting the encrypted first data and storing them on the security data processing device; or receiving a security data processing device on which have been stored first data; for each target data processing device, using the security data processing device to: obtain a device cryptographic certificate from the target data processing device, the device cryptographic certificate having been generated by, and being verifiable as having been generated by, a trusted entity; verify the device cryptographic certificate as having been generated by the trusted entity; generate second data using the first data; and store the second data on the target data processing device.

BRIEF DESCRIPTION OF THE DRAWINGS

The invention will now be described, by way of example, with reference to the accompanying drawings, in which:

FIG. 1 is a block diagram of part of a manufacturing process in which the method and security data processing devices of the invention are used;

FIG. 2 is a flow diagram of one embodiment of the method of the invention;

FIG. 3 is a flow diagram of another embodiment of the method of the invention;

DETAILED DESCRIPTION OF EMBODIMENTS

Figure 4:
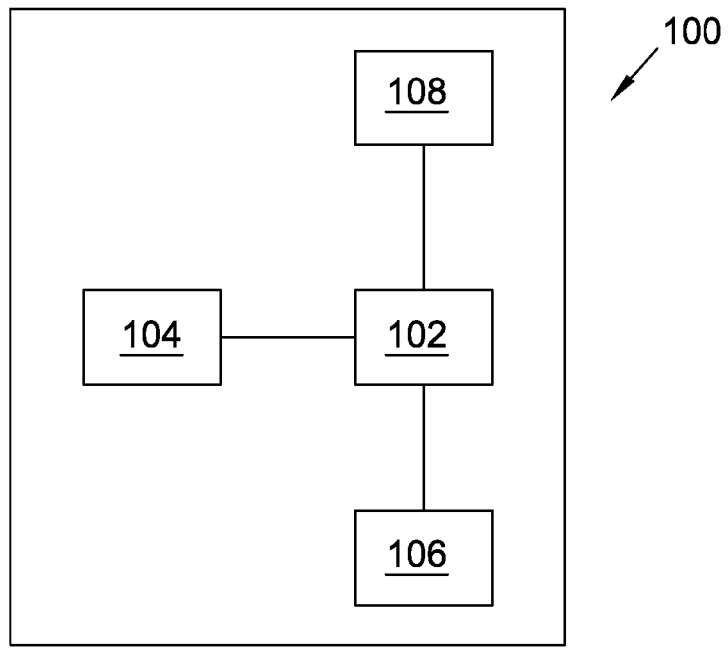
FIG. 4 is a block diagram of one embodiment of the security data processing device of the invention.

The part 10 of a manufacturing process shown in FIG. 1 comprises development 12 of program code by or on behalf of an original equipment manufacturer (OEM) for deployment on target data processing devices by a contract manufacturer (CM), transmitting the program code to an OEM management system (OMS) 14, transmitting an order including the program code via a communications medium 16 to a factory management system (FMS) 18 of the CM, and transmitting the program code to a device programmer 20 of the CM for storage on the target data processing devices.

Development 12 of the program code makes use of a security data processing device in the form of a programmed development hardware security module (HSM) 22. Once development of the program code is complete, the program code is signed using a private key of a public key encryption key pair of a trusted entity to produce a cryptographic certificate that includes the program code.

The public key of the key pair of the trusted entity can be used to verify that the cryptographic certificate was in fact signed using the private key of the trusted entity. The trusted entity could, for example, be the developer of the program code, the OEM or the manufacturer of the target data processing devices, if it trusts the developer sufficiently to provide it with a delegated private key. It could alternatively be a certification authority such as Symantec Corporation.

The cryptographic certificate is stored on the development HSM 22 together with the public key of the key pair of the trusted entity.

The development HSM 22 has stored on it a public key encryption key pair. Whenever an HSM is required to transmit data to another HSM, the HSM establishes a shared key with the other HSM in known fashion, by transmitting its public key to the other HSM and receiving the public key of the other HSM, combining its private key with the public key of the other HSM to establish the shared key, encrypting the data using the shared key and transmitting the encrypted data to the other HSM. The other HSM receives the encrypted data and uses the shared key to decrypt the encrypted data.

This process is used to transmit the encrypted cryptographic certificate including the program code, together with the public key of the trusted entity, to a security data processing device in the form of an OMS HSM 24 that forms part of the OMS 14.

Having decrypted the encrypted cryptographic certificate the OMS HSM 24 can use the public key of the trusted entity, which was transmitted with the certificate, to verify that the certificate was in fact signed by the trusted entity. If the validation is successful, the decrypted certificate is stored on the OMS HSM 24.

When the OEM wishes to instruct the CM to store the program code on the target data processing devices, it uses a private key of a public key encryption key pair to sign the certificate including the program code and a value of a permitted number of target data processing devices on which the program code is permitted to be stored, to produce a further certificate. The further certificate can include additional information, such as the manufacturer of the target data processing devices, the model of the target data processing devices and an identification of the CM that the OEM wishes to store the program code on the target data processing devices, as well as instructions for execution by an HSM that receives the further certificate.

There may be circumstances where it is unnecessary to restrict the number of target data processing devices on which the program code is permitted to be stored.

It would be possible in that case to omit the value of the number of target data processing devices from the further certificate but this would require the HSM receiving the further certificate to be programmed to interpret the absence of the value as the absence of a restriction on the permitted number of target data processing devices.

A simpler solution, which does not require any additional programming of the HSM receiving the further certificate, is to specify a value of the number of target data processing devices that is so large that it is unlikely to be exhausted by the CM.

The OMS HSM 24 establishes a shared key with a security data processing device in the form of an FMS HSM 26 that forms part of the FMS 18, encrypts the further certificate using the shared key and transmits it to the FMS HSM 26 using the communications medium 16, which as shown in FIG. 1 is an Internet connection.

The FMS HSM 26 receives the encrypted further certificate, decrypts it using the shared key and verifies the further certificate as having been signed by the OEM.

The FMS HSM 26 has been provided to the CM by a trusted entity such as the OEM. Where it is intended to include the identification of the CM in the further certificate, the FMS HSM 26 has stored on it an identification of the CM, this having been stored on the FMS HSM 26 by the trusted entity before delivery of the FMS HSM 26 to the CM. The FMS HSM 26 can then compare the identification of the CM stored on the FMS HSM 26 with the identification of the CM included in the further certificate, to confirm that the further certificate has been sent to the correct CM. If the identifications do not match, the FMS HSM halts the process.

It will be appreciated that, instead of transmitting the encrypted further certificate using the Internet connection, the OMS HSM 24 can instead store the encrypted further certificate on a computer connected to the OMS HSM, such that the encrypted further certificate can be transmitted by electronic mail to a computer connected to the FMS HSM 26, and the encrypted further certificate transferred from the computer to the FMS HSM.

Alternatively, the OMS HSM 24 can store the encrypted further certificate on a data carrier such as a USB stick, such that the data carrier can be delivered to the CM and the encrypted further certificate transferred from the data carrier to the FMS HSM 26.

It will be apparent that these approaches are less convenient than using the Internet connection, because they require the public key of the OMS HSM 24 to be obtained from the OMS HSM and manually entered into the FMS HSM 26 and the public key of the FMS HSM 26 to be obtained from the FMS HSM and manually entered into the OMS HSM 24, but they may be necessary in some circumstances, for example where, for information security reasons, the CM is unwilling to have an Internet connection to its FMS 18.

If the identifications of the CM match, the FMS HSM 26 establishes a shared key with a security data processing device in accordance with the invention in the form of a device programmer HSM 28 that forms part of the device programmer 20, encrypts the further certificate using the shared key and transmits it to the device programmer HSM 28.

The device programmer HSM 28 receives the encrypted further certificate and decrypts it using the shared key. The device programmer HSM verifies the further certificate as having been signed by the OEM.

In accordance with the method of the invention, for each target data processing device, the device programmer HSM 28 obtains a device certificate from the target data processing device. The device programmer HSM verifies that the device certificate has been signed by a trusted entity, such as a manufacturer of the device, or the OEM.

Where the further certificate includes the manufacturer and model of the target data processing devices, the manufacturer and model of the target data processing device are included in the device certificate.

The device programmer HSM 28 compares the manufacturers and models in the further certificate and the device certificate to confirm that the target data processing device presented for storage of the program code is of the type specified by the OEM. If the manufacturers and models do not match, the device programmer HSM halts the process.

If the manufacturers and models match, the device programmer HSM 28 determines whether the value of the permitted number of devices is greater than zero and, if so, establishes a shared key with the target data processing device, executes the instructions included in the further certificate, which might, for example, cause the device programmer HSM to encrypt a portion of the program code included in the further certificate and store the encrypted portion on the target data processing device.

The device programmer HSM 28 stores an identifier of the target data processing device included in the device certificate for encryption, and transmission using the shared key approach already described, through the FMS HSM 26 to the OMS HSM 24 to provide the OEM with an audit log of the target data processing devices on which the program code has been stored.

Turning to FIG. 2, this shows a first embodiment of the method of the invention, which is used to store program code on a target data processing device.

At step 30, a security data processing device (SDPD1) in accordance with the invention establishes a shared key using public key cryptography with another security data processing device (SDPD2).

At step 32, SDPD1 receives an encrypted cryptographic certificate and public key from SDPD2 and decrypts the certificate using the shared key.

At step 34 SDPD1 uses the public key received from SDPD2 to verify that the cryptographic certificate was signed by a trusted entity. If the verification fails, the method stops.

If the verification is successful, at step 36 SDPD1 stores program code, a value of a permitted number of target data processing devices on which the program code is permitted to be stored, a manufacturer and model of the target data processing devices on which the program code is intended to be stored, and instructions executable by SDPD1, the program code, value, manufacturer, model and instructions having been included in the encrypted certificate received from SDPD2.

Each time a target data processing device is presented to SDPD1 for storage of the program code, at step 38 SDPD1 determines whether the value is greater than zero. If the determination fails, the method stops.

If the determination is successful, at step 40 SDPD1 obtains a device cryptographic certificate and a public key of a trusted entity from the target data processing device.

At step 42 SDPD1 uses the public key to verify that the device cryptographic certificate was signed by the trusted entity. If the verification fails, the method stops.

If the verification is successful, at step 44 SDPD1 determines whether a device manufacturer and model included in the device cryptographic certificate match the manufacturer and model included in the encrypted certificate received from SDPD2. If the determination fails, the method stops.

If the determination is successful, at step 46 SDPD1 executes the instructions included in the encrypted certificate received from SDPD2. In this embodiment, the instructions cause SDPD1 simply to copy the program code included in the encrypted certificate received from SDPD2.

At step 48 SDPD1 establishes a shared key using public key cryptography with the target data processing device.

At step 50 SDPD1 encrypts the copy of the program code using the shared key established with the target data processing device.

At step 52 SDPD1 stores the encrypted program code on the target data processing device.

At step 54 SDPD1 verifies the encrypted program code stored on the target data processing device and, if the verification is successful, decrements the value of the permitted number of target data processing devices stored in SDPD1. SDPD1 can optionally store a device identifier included in the device cryptographic certificate for transmission to SDPD2 for audit purposes.

Because an untrusted entity might try to circumvent the limit imposed on the permitted number of target data processing devices by forcing a failure of the verification at step 54, so that the value of the permitted number of target data processing devices is not decremented, in an alternative embodiment of the method the value of the permitted number of target data processing devices is instead decremented at step 40 following a successful determination that the value is greater than zero.

SDPD1 awaits presentation of another target data processing device, whereupon the flow returns to step 38.

It will be appreciated that the method of the invention is not limited to storage of program code on target data processing devices.

As mentioned previously, the method can be used to store configuration data on target data processing devices, which configuration data determine the operation of program code already stored on the target data processing devices.

The method can also be used to store further cryptographic certificates on target data processing devices.

For example, in the method already described, it was necessary for the target data processing devices to have stored on them a public key encryption key pair in order to establish the shared key with SDPD1.

The method can be used to store a private key of a key pair in a secure region of a target data processing device and a cryptographic certificate including the public key of the key pair and signed using the private key of a trusted entity on the target data processing device, in preparation for use in the method already described of storing program code on the target data processing device.

FIG. 3 shows a second embodiment of the method of the invention, which is used to store a further cryptographic certificate on a target data processing device.

At step 60, a security data processing device SDPD3 in accordance with the invention is received by a contract manufacturer.

SDPD3 has stored on it a public key encryption key pair, a value of a permitted number of target data processing devices on which the further cryptographic certificates are permitted to be stored, a manufacturer and model of the target data processing devices on which the further cryptographic certificates are intended to be stored, instructions executable by SDPD3, and a cryptographic certificate signed by the OEM or another trusted entity.

At step 62 the CM obtains the cryptographic certificate from SDPD3. The cryptographic certificate, unlike the key pair, value, manufacturer and model and instructions, is stored in a non-secure region of SDPD3, which can be accessed by the CM. The CM verifies the certificate as having been signed by a trusted entity. If the verification fails, the method stops.

If the verification is successful, the CM can be confident that SDPD3 has originated from a trusted entity, and can safely be used in the method, which proceeds to step 64.

Steps 64, 66, 68 and 70 correspond to steps 38, 40, 42 and 44, respectively and are not described again.

If the determination whether a device manufacturer and model included in the device cryptographic certificate match the manufacturer and model stored on SDPD3 is successful, at step 72 SDPD3 executes the instructions stored on SDPD3, which cause SDPD3 to generate a device serial code and further cryptographic certificate including the device serial code and signed using a private key of the key pair stored on SDPD3.

At step 74 SDPD3 establishes a shared key using public key cryptography with the target data processing device.

At step 76 SDPD3 encrypts the further cryptographic certificate and the public key of the key pair stored on SDPD3 using the shared key established with the target data processing device.

At step 78 SDPD3 stores the encrypted further cryptographic certificate on the target data processing device, which decrypts the further cryptographic certificate and stores it and the public key on the target data processing device.

At step 80 SDPD3 verifies the (unencrypted) certificate and public key stored on the target data processing device and, if the verification is successful, decrements the value of the permitted number of target data processing devices stored in SDPD3.

Steps 74, 76 and 78 may appear redundant, given that the further certificate is deliberately stored on the target data processing device such that it can be obtained on request from target data processing device.

However, as mentioned above, it may be required to generate and store a key pair on the target data processing device, as well as the further cryptographic certificate, in which case it is important that the key pair are encrypted before they are stored on the target data processing device, in order that they cannot be identified while passing between SDPD3 and the target data processing device. For this reason, it is simpler to encrypt all data that are transferred between the secure data processing device and the target data processing device.

It is envisaged that an HSM such as a Thales Solo HSM would typically be used to carry out the method of the invention.

However, it is also envisaged that the method of the invention could be carried out using a Java® card, together with a general-purpose computer equipped with a card reader.

Whereas an HSM is tamper-evident and it is difficult to gain access to data stored on an HSM, it is relatively easy to gain access to data stored on a general-purpose computer. If a Java® card is used as the security data processing device of the method, it is important that all data received and transmitted by the card are encrypted, because the security of the method of the invention would be undermined if unencrypted data were stored on a general-purpose computer during any part of the method.

Turning to FIG. 4, this is a block diagram of an HSM 100 in accordance with the invention. The HSM 100 is of conventional construction, comprising a secure processor 102, secure memory 104, a cryptographic accelerator 106 and an input-output interface 108.

The secure memory 104 contains program code to enable the HSM 100 to carry out the method of the invention.

Figure 5:
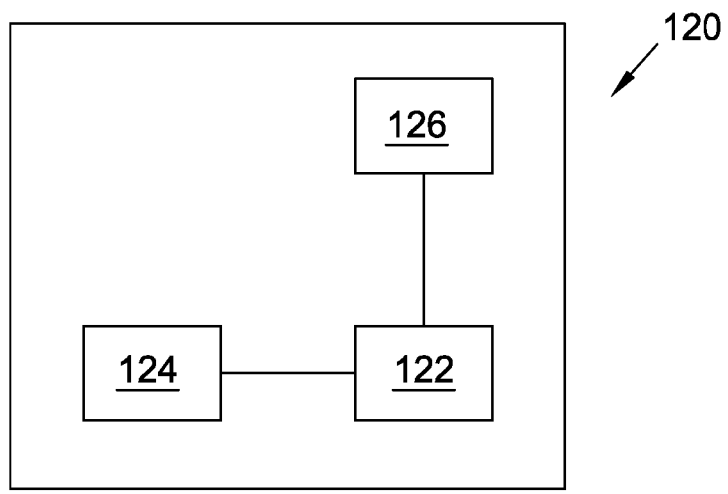
FIG. 5 is a block diagram of another embodiment of the security data processing device of the invention.

FIG. 5 is a block diagram of a Java® card 120 in accordance with the invention. The card 120 is also of conventional construction, comprising a secure processor 122, a secure memory 124 and an input/output interface 126.

The secure memory 124 contains program code to enable the card 120 to carry out the method of the invention.

The Java® card of FIG. 5 does not include a cryptographic accelerator and so is much slower to use than the HSM of FIG. 4. However, it is also much less expensive than the HSM of FIG. 4 and can easily be sent to a CM by mail. It is envisaged that the secure memory 124 of the card 120 would store a value of a permitted number of target data processing devices, which value would be decremented for each target device programmed using the card, and that when the value reached zero, the card would simply be discarded.

It will be apparent that the above description relates only to selected embodiments of the invention, and that the invention encompasses other embodiments as defined by the claims set out hereafter.

The invention claimed is:

1. A method of storing data on target data processing devices, the method performed by a security data processing device wherein the security data processing device is a separate device to the target data processing devices, the method comprising, for each target data processing device:
   receiving encrypted first data comprising a cryptographic certificate, wherein receiving the encrypted first data comprises the security data processing device receiving a public key of a first public key encryption key pair, transmitting a public key of a second public key encryption key pair stored on the security data processing device, combining the public key of the first key pair with a private key of the second key pair to produce a shared key, and receiving encrypted first data that have been encrypted using the shared key;
   storing the encrypted first data on the security data processing device;
   using the security data processing device, decrypting the encrypted first data and storing them on the security data processing device, wherein decrypting the encrypted first data comprises decrypting the encrypted first data using the shared key;
   obtaining, by the security data processing device, from said cryptographic certificate stored on the security data processing device, an indication of at least one of a model and a manufacturer of a target processing device;
   obtaining, by the security data processing device a device cryptographic certificate from the target data processing device, the device cryptographic certificate having been generated by, and being verifiable as having been generated by, a trusted entity;
   obtaining, by the security data processing device, from the device cryptographic certificate, an indication of at least one of a model and a manufacturer of the target data processing device;
   verifying, by the security data processing device, the device cryptographic certificate as having been generated by the trusted entity;
   verifying, by the security data processing device, that said indication of at least one of a model and a manufacturer of a target processing device obtained from the device cryptographic certificate corresponds to said indication of at least one of a model and a manufacturer of a target data processing device obtained from the cryptographic certificate stored on the security data processing device, and in response to a successful verification:
generating second data using the first data; and
storing the second data on the target data processing device.

2. The method according to claim 1, further comprising receiving a value of a permitted number of target data processing devices on which the second data are permitted to be stored, and storing the value on the security data processing device; and
for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

3. The method according to claim 1, comprising receiving the security data processing device on which have been stored the first data and a value of a permitted number of target data processing devices on which the second data are permitted to be stored; and
for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

4. The method according to claim 1, comprising receiving the security data processing device on which have been stored the first data and receiving a value of a permitted number of target data processing devices on which the second data are permitted to be stored, and storing the value on the security data processing device; and
for each target data processing device, using the security data processing device to:
determine whether the value of the permitted number of target data processing devices is greater than zero;
if so, obtain and verify the device cryptographic certificate, generate and store the second data, and decrement the value of the permitted number of target data processing devices.

5. The method according to claim 1, wherein receiving the encrypted first data comprises receiving them on the security data processing device via an Internet connection.

6. The method according to claim 2, comprising receiving an encrypted value, and using the security data processing device to decrypt the encrypted value and store the decrypted value on the security data processing device.

7. The method according to claim 1, wherein the first data comprise computer-readable instructions for use by the security data processing device.

8. The method according to claim 1, wherein the first data comprise program code for execution by the target data processing devices.

9. The method according to claim 1, wherein the first data comprise configuration data that determine the operation of program code stored on the target data processing devices.

10. The method according to claim 8, wherein generating the second data further comprises encrypting the at least part of the first data.

11. The method according to claim 1, wherein the first data comprise a private key of a public key cryptographic key pair.

12. The method according to claim 11, wherein generating the second data using the first data comprises, for each target data processing device, generating a further cryptographic certificate for the target data processing device by signing the device cryptographic certificate using the private key.

13. The method according to claim 12, wherein generating the further cryptographic certificate further comprises signing the device certificate and a device identifier for the target data processing device using the private key.

14. The method according to claim 1, wherein receiving the encrypted first data and the value comprise receiving a cryptographic certificate comprising the encrypted first data and an encrypted value of the permitted number of target data processing devices.

15. A security data processing device comprising a processor, and a memory containing a decryption key and program code executable by the processor to:
receive encrypted first data comprising a cryptographic certificate, wherein receiving the encrypted first data comprises the security data processing device receiving a public key of a first public key encryption key pair, transmitting a public key of a second public key encryption key pair stored on the security data processing device, combining the public key of the first key pair with a private key of the second key pair to produce a shared key, and receiving encrypted first data that have been encrypted using the shared key;
store the encrypted first data on the security data processing device;
using the security data processing device, decrypt the encrypted first data and storing them on the security data processing device, wherein decrypting the encrypted first data comprises decrypting the encrypted first data using the shared key;
obtain, at the security data processing device, from said cryptographic certificate stored on the security data processing device, an indication of at least one of a model and a manufacturer of a target processing device, wherein the security data processing device is a separate device to the target data processing device;
obtain at the security data processing device, a device cryptographic certificate from a target data processing device;
obtain, at the security data processing device, from the device cryptographic certificate, an indication of at least one of a model and a manufacturer of the target data processing device;
verify, at the security data processing device, the device cryptographic certificate as having been generated by the trusted entity;
verify, at the security data processing device, that said indication of at least one of a model and a manufacturer of a target processing device obtained from the device cryptographic certificate corresponds to said indication of at least one of a model and a manufacturer of a target data processing device obtained from the cryptographic certificate stored on the security data processing device, and in response to a successful verification:
generate second data using first data stored in the memory; and
store the second data on the target data processing device.

16. The security data processing device according to claim 15, wherein the security data processing device is operable to receive an encrypted cryptographic certificate that includes the first data and instructions executable by the processor, to decrypt the encrypted cryptographic certificate, to verify the cryptographic certificate as having been generated by a trusted entity using a public key of the trusted entity, and to execute the instructions executable by the processor to generate the second data from the first data.

* * * * *